United States Patent
Main

[11] Patent Number: 5,575,134
[45] Date of Patent: Nov. 19, 1996

[54] APPARATUS AND METHOD FOR FILLING A BIN

[76] Inventor: Scott C. Main, 1030 Gibson, Selah, Wash. 98942

[21] Appl. No.: 424,705
[22] Filed: Apr. 18, 1995
[51] Int. Cl.⁶ .................................................. B65B 35/30
[52] U.S. Cl. .................. 53/443; 53/448; 53/475; 53/244; 53/248
[58] Field of Search .................. 53/448, 473, 475, 53/493, 55, 504, 543, 537, 538, 244, 247, 251, 534, 535, 536, 248, 259, 443

[56] References Cited

U.S. PATENT DOCUMENTS

| | | | |
|---|---|---|---|
| 2,896,384 | 7/1959 | Carlsen et al. | 53/59 |
| 3,097,460 | 7/1963 | O'Brien | 53/64 |
| 3,229,444 | 1/1966 | Rouse | 53/245 |
| 3,269,083 | 8/1966 | Marano | 53/64 |
| 3,420,038 | 1/1969 | Crabb | 53/248 |
| 3,932,982 | 1/1976 | Klapp | 53/244 |
| 4,062,168 | 12/1977 | Watts et al. | 53/64 |
| 4,081,096 | 3/1978 | Kupcikevicius | 53/35 |
| 4,194,343 | 3/1980 | Myers et al. | 53/493 |
| 4,329,831 | 5/1982 | Warkentin et al. | 53/537 |
| 4,464,880 | 8/1984 | Peters et al. | 53/493 |
| 4,600,065 | 7/1986 | Morris | 177/123 |
| 4,608,808 | 9/1986 | Ryan et al. | 53/436 |
| 4,875,327 | 10/1989 | Wilde | 53/475 |
| 4,965,982 | 10/1990 | Jesperson et al. | 53/248 |
| 5,159,796 | 11/1992 | Tas | 53/245 |

FOREIGN PATENT DOCUMENTS

| | | |
|---|---|---|
| 0464944 | 1/1991 | European Pat. Off. . |
| 1243086 | 6/1967 | Germany . |
| 600034 | 3/1978 | U.S.S.R. . |

Primary Examiner—John Sipos
Assistant Examiner—John Paradiso
Attorney, Agent, or Firm—Stratton Ballew

[57] ABSTRACT

Disclosed is a method and apparatus for loading a bin with articles such as fruit. The apparatus has a filling conveyor pivotable between a position within the bin to be filled and the top of the bin. The discharge end of the filling conveyor is maintained at an offset distance from the contents of the bin. The filling conveyor carries a plurality of resilient flaps pivotally mounted at one end thereof to the filling conveyor for movement therewith. The flaps successively carry rows of the articles along an upper run from a take-up end to a discharge end, at which end the articles are dropped off of the flap. A second flap, moving along a lower run in a direction opposite to the upper run, gently catches the dropped articles, and deposits the articles in the bin. Subsequent flaps moving along the lower run then sweep the deposited articles away from the drop location and toward to other end of the bin, allowing the articles to pile up at that end. The process is repeated until the bin is filled, a sensor detecting this condition causing the flow of articles to stop, and trigger the replacement of the now full bin with an empty bin.

13 Claims, 10 Drawing Sheets

APPARATUS AND METHOD FOR FILLING A BIN

BACKGROUND OF THE INVENTION

1. FIELD OF THE INVENTION

The present invention relates to the field of container filling. More particularly, the invention pertains to methods and apparatus for bulk filling a dry bin with articles such as fruit and the like such that the articles are not bruised or damaged during the filling process.

2. DESCRIPTION OF THE PRIOR ART

The are many examples of methods and apparatus for filling bins and containers. Most of these employ a conventional conveyor system, having a conveyor belt driven thereon, to advance the articles toward the bin. To decrease damage to the articles, and to make more efficient use of the space in the bin, the articles are commonly directed into the bin using a chute.

In some of the previous apparatus the chute can be moved into the bin, to decrease the distance that the articles must fall. As the bin fills, the chute is moved to maintain the outlet of the chute relatively above the level of the articles collected in the bin. Alternatively, the bin may be moved to accomplish the same ends. This often entails pivoting the bin toward the chute, so that the articles pile up against a side wall of the bin. As the level of articles collected approaches the top of the bin, the bin is pivoted back towards its normal upright position.

In some apparatus both the chute and the bin are moved. Each may be pivoted to achieve a layered effect in the bin. This lessens damage to the articles and provides for a more efficient use of the space within the bin.

Other examples eliminate the chute, and direct the conventional conveyor belt into the bin. The bin is usually pivoted toward the conveyor to decrease the distance the articles must fall. Additionally, the conveyor may be translated into the bin. The bin may be raised or lowered to achieve a stacking arrangement of articles in the bin.

There is a demonstrated need in the field of container and bin packing, especially in the fruit industry for a method and apparatus which permits articles such as fruit to be gently layered into the container or bin so as to prevent damage to the articles.

SUMMARY OF THE INVENTION

The present invention comprises a method and apparatus for loading a bin with articles such as fruit.

The apparatus has a filling conveyor with an uptake end and a discharge end. The filling conveyor is pivotable between a first position where the discharge end is within the bin and a second position where the discharge end is disposed above the top of the bin. During operation, the discharge end of the filling conveyor is maintained at an offset distance from the articles collected in the bin. The filling conveyor is moved about a first and a second axis spaced from, and substantially parallel to the first axis. An upper run and a lower run are defined between the first and second axes, the upper run spaced relatively above the lower run.

The filling conveyor carries a plurality of resilient flaps pivotally mounted at one end thereof to the filling conveyor for movement therewith. The flaps are successively moved through a series of locations and oriented in a series of positions associated with the location of the flap to deliver the article to the bin, gently dispense the articles therein, and sweep the article into a stack of such articles collected within the bin.

As each flap approaches a pickup location the flap engages a support surface which causes the flap to pivot into an article receiving position. A row of articles are fed onto the flap at the pickup location. The article is transported down, into the bin, as the flap moves along the upper run. The flap becomes disengaged from the support surface proximate a drop location. Without the support of the support surface the flap pivots, under the influence of gravity, into an article dropping position which causes the article to drop off of the flap. The flap is then pivoted into an article receiving position as it approaches a catch location, for catching a previously dropped article. As the flap carrying the caught article contacts previously dispensed articles, it is drawn out from between the article it is carrying and the previously deposited articles, whereby the carried article is gently slid off the flap and deposited into the pile of previously dispensed articles. The flaps sweep the previously dispensed articles toward one end of the bin as the flaps move along the lower run.

Preferably, the flaps are used to successively carry rows of the articles along an upper run and into the bin, at which point the row of articles are dropped off of the flap. Another flap, moving along a lower run in a direction opposite to the upper run, gently catches the row of dropped articles, and deposits the row into the bin. Subsequent flaps moving along the lower run then sweep the deposited articles away from the drop location and toward to other end of the bin, allowing the articles to pile up at that end. The process is repeated until the bin is filled, a sensor detecting this condition causing the flow of articles to stop, and trigger the replacement of the now full bin with an empty bin.

DESCRIPTION OF THE PREFERRED EMBODIMENTS

Figure 1:
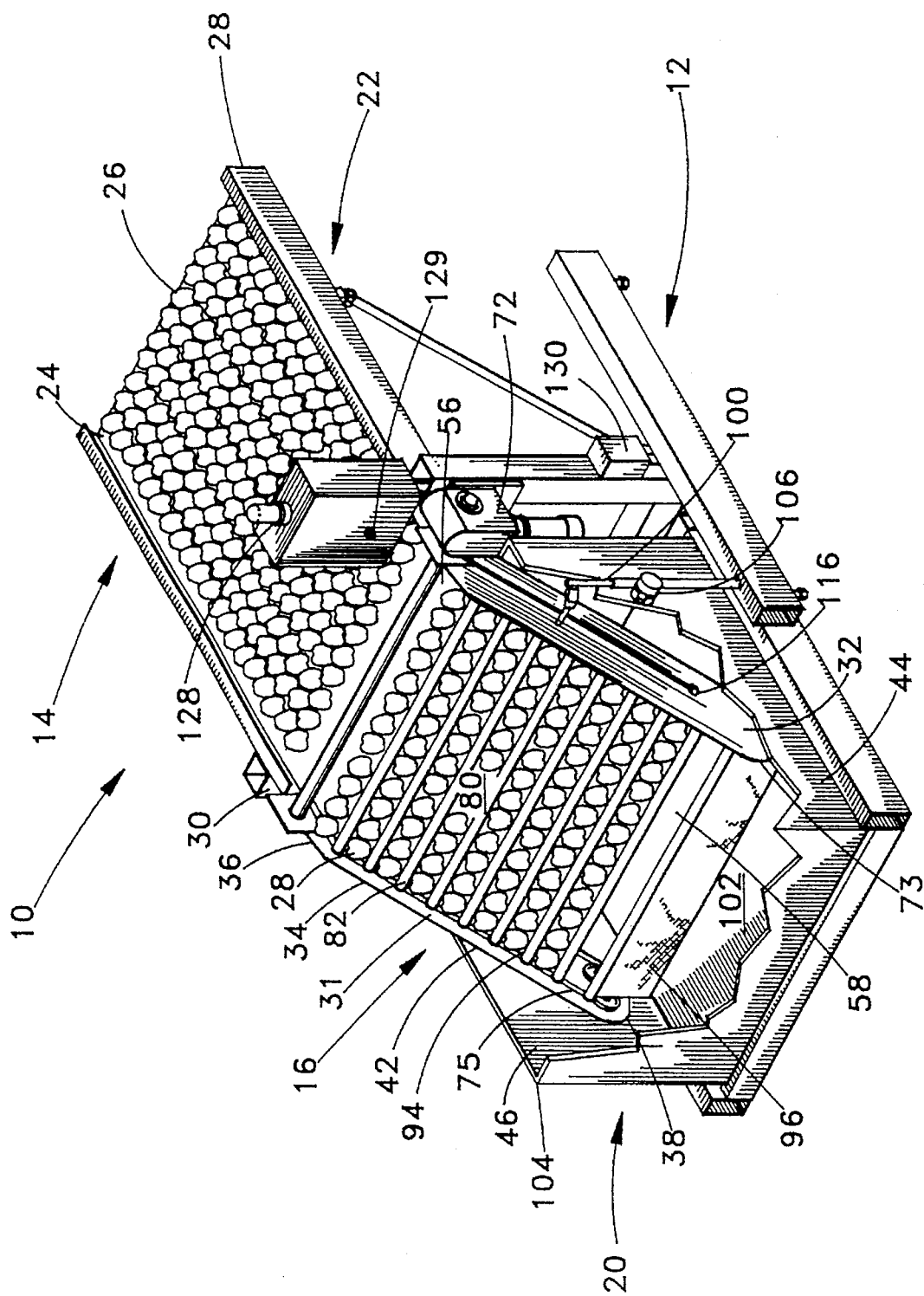
FIG. 1 is a perspective view of the bin filler without the cover at the start of operation with the filling conveyor lowered into an empty bin to be filled.

With reference to FIGS. 1–4, the preferred embodiment of the bin filler 10 has a base frame 12 to which a feeding conveyor 14 is fixed and to which a filling conveyor 16 is pivotally mounted for movement into and out of the bin 20 to be filled.

The feeding conveyor 14 is a conventional conveyor belt mechanism. The feeding conveyor 14 has a feeding conveyor frame 22 which supports an endless feeding conveyor belt 24 such that a portion of the feeding conveyor belt 24 forms a substantially horizontal surface for carrying articles 26 thereon. The feeding conveyor 14 has a receiving end 28 and a delivering end 30. The feeding conveyor 14 transports articles 26, such as fruit, from a source of the articles 26, such as a hopper, truck or another conveyor system (not shown), to the filling conveyor 16. The feeding conveyor 14 is preferably of substantially the same width as the filling conveyor 16 so an entire row of articles 28 may be loaded onto the filling conveyor 16 at one time.

With continuing reference to FIGS. 1–4, the filling conveyor 16 has a filling conveyor frame 31 which includes a pair of laterally spaced frame arms 32, 34. The filling conveyor frame 31 is pivotally mounted proximate a take-up end 36 thereof to the base frame 12. A discharge end 38 is defined longitudinally opposed from the take-up end 36. The distance between the frame arms 32, 34 is determined by the width of the bin 20 to be filled. Preferably the outside surfaces 40, 42 of each of the frame arms 32, 34 respectively, will be adjacent a side wall 44, 46 respectively, of the bin 20 when the filling conveyor 16 is pivoted into the bin 20. This will permit the filling conveyor 16 to deposit an entire row of articles 28 into the bin 20 at the same time.

Figure 5:
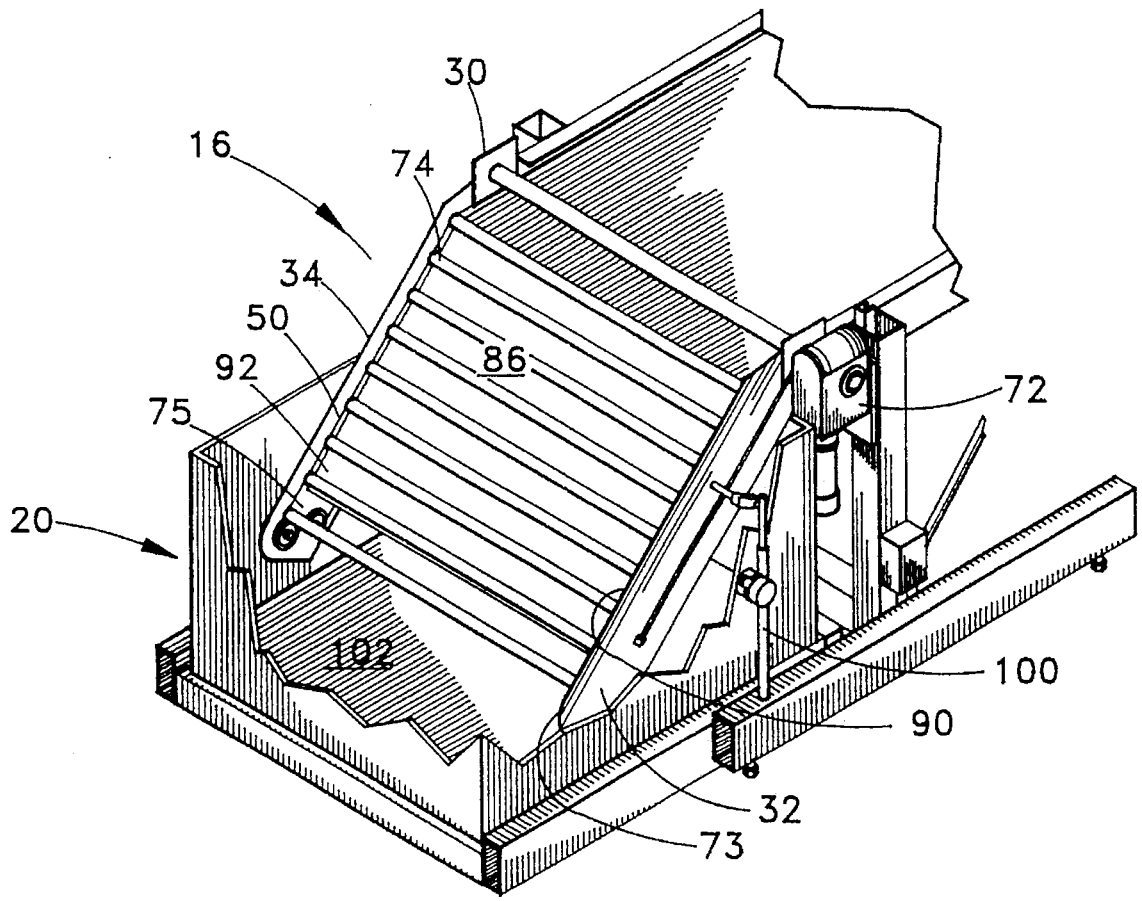
FIG. 5 is a perspective view of the bin filler with the flaps removed to partially reveal the chain drive mechanism, and a portion the filling conveyer frame broken away.

With reference to FIG. 5, at least one flexible endless member is mounted to the filling conveyor frame 31 for repetitive movement with respect thereto. In the preferred embodiment, a first and second drive belts 50, 52 serve as the endless members. Each drive belt 50, 52 is mounted adjacent a respective frame arm 32, 34 for movement along an upper run 54 from a pickup location 56 proximate the take-up end 36 to a drop location 58 proximate the discharge end 38, then about a first axis 60 proximate the discharge end 38, along a lower run 62 from a catch location 64 proximate the discharge end 38, past a depositing location 66, and toward the take-up end 36, and then about a second axis 68 proximate the take-up end 36. In the preferred embodiment, the drive belts 50, 52 are implemented as chain type members in driving engagement with a drive sprocket 70 (not shown), the drive sprocket 70 being turned by a drive means such as an electric motor 72. Alternatively, relatively smooth surfaced belts in friction engagement with the drive means, or toothed belts in meshing engagement with the drive means may be used. Any other conventional mechanism for driving a conveyor system may be successfully employed.

With further reference to FIG. 5, a plurality of rigid support rods 74 are fixed between the respective drive belts 50, 52 for movement therewith. The support rods 74 are evenly distributed about the circumference of the drive belts 50, 52. The support rods 74 are preferably composed of steel, or stainless steel. In applications such as loading fruit the size of apples, a spacing between adjacent support rods 74 of approximately 6¼ inches has been found to be suitable.

Figure 6:
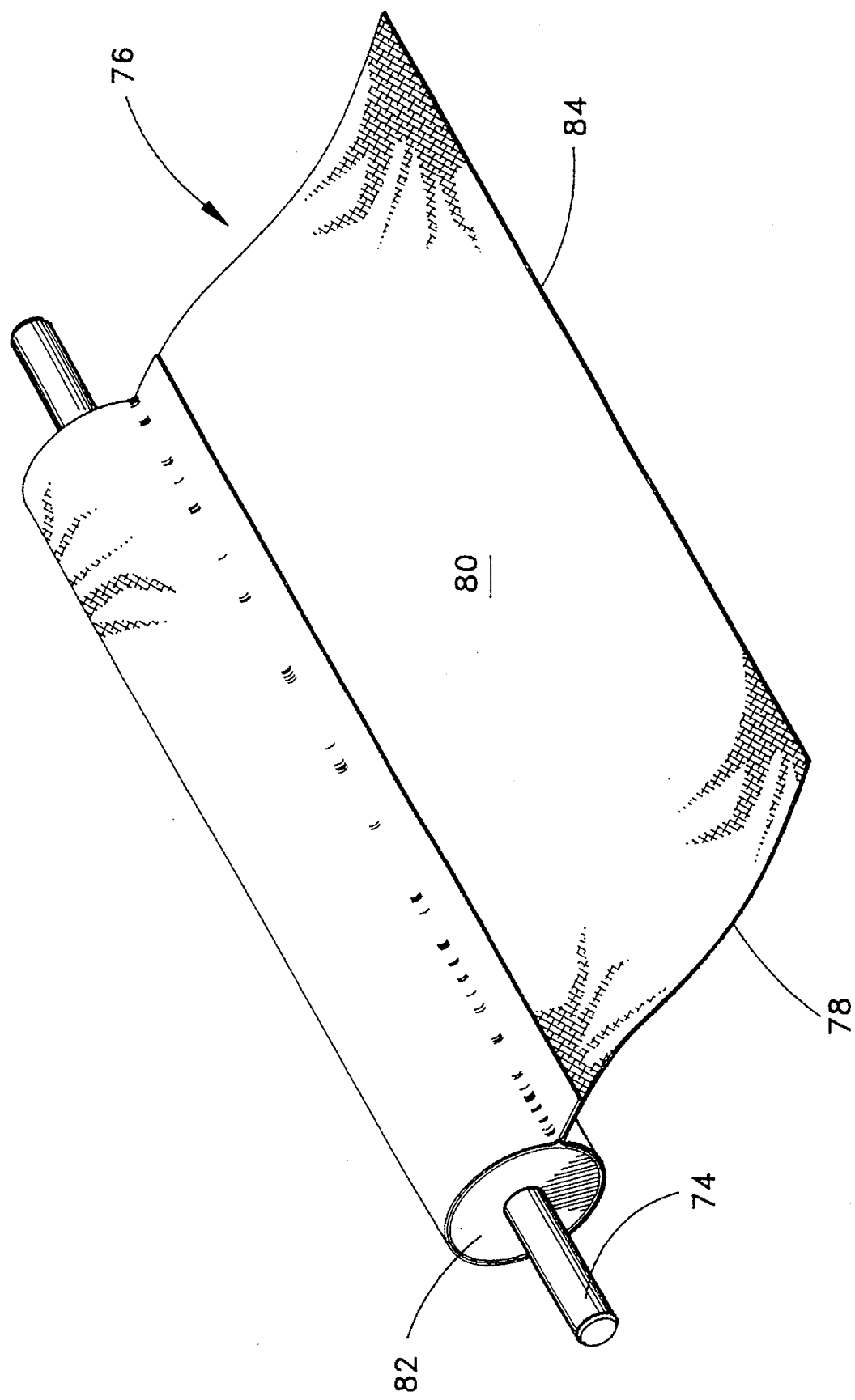
FIG. 6 is a perspective view of a single flap on the on the support rod

With reference to FIGS. 1–4, and particular reference to FIG. 6, a flap 76 is pivotally mounted to each of the support rods 74 for movement therewith. The flaps 76 are preferably rectangular in shape and have a front surface 78 and a rear surface 80 opposed to the front surface 78. A padded sleeve 82 is formed at one end of the flap 76, having a diameter greater than the diameter of the support rods 74. The remainder of the flap 76 forms the tail 84 thereof. The padded sleeve 82 is received about the support rod 74 for pivotally mounting the flap 76 thereto. The flaps 76 are preferably made from a resilient material. Rubber coated cloth has been found to be a suitable material for making the flaps 76. The flaps 76 should be slightly longer than the distance between adjacent support rods 74 and should extend completely across the filling conveyor 16 from the inside surface 73 of one frame arm 32 to the inside surface 75 of the other frame arm 34. In the preferred embodiment the flaps 76 are approximately 6½ inches in length and inches wide.

Figure 7:
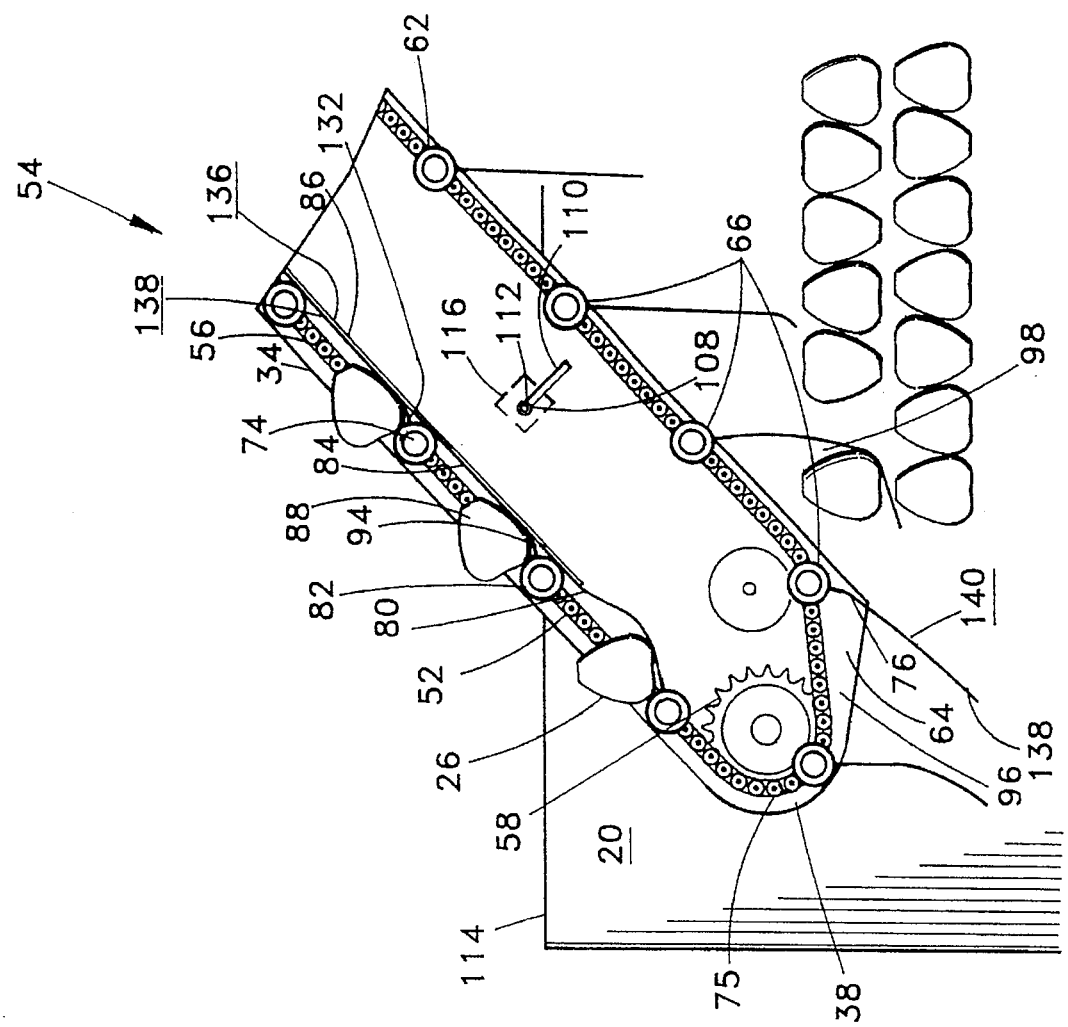
FIG. 7 is a side diagrammatic view of the operation of the bin filler.

With reference to FIG. 7, support surface 86 is fixed between the frame arms 32, 34 for supporting the flaps 76 in an article receiving position 88. The support surface 86 is formed of a plate, preferably of steel or stainless steel. Opposed side edges 90, 92 of the support surface 86 are fixed to the inside surfaces 73, 75 of the respective frame arms 32, 34 beneath the upper run 54 of the respective drive belts 50, 52. In the article receiving position 88 the tail 84 of the flap 76 is substantially parallel to, and displaced slightly below the upper run 54. Since the padded sleeve 82 of the flap 76 travels along the upper run 54, a slight concavity 94 is formed with respect to the rear surface 80 of the flap 76. The padded sleeve 82 and the support rod 74 form a barrier preventing the articles 26 from falling off of the flap 76 toward the discharge end 38 while the flap 76 travels between the pickup location 56 and the drop location 58. The concavity 94 formed in the flap 76 prevents the articles 26 from falling off the flaps 76 toward the take-up end 36 of the filling conveyor 16.

The support surface 86 extends from before the pickup location 56 to just short of the drop location 58 on the upper run 54. This causes the flaps 76 to be pivoted into the article receiving position 88 in time for receiving the articles 26 thereupon, and pivoted back, under the influence of gravity, into an article dropping position 96 in time to drop the article 26 at the drop location 58.

Figure 8:
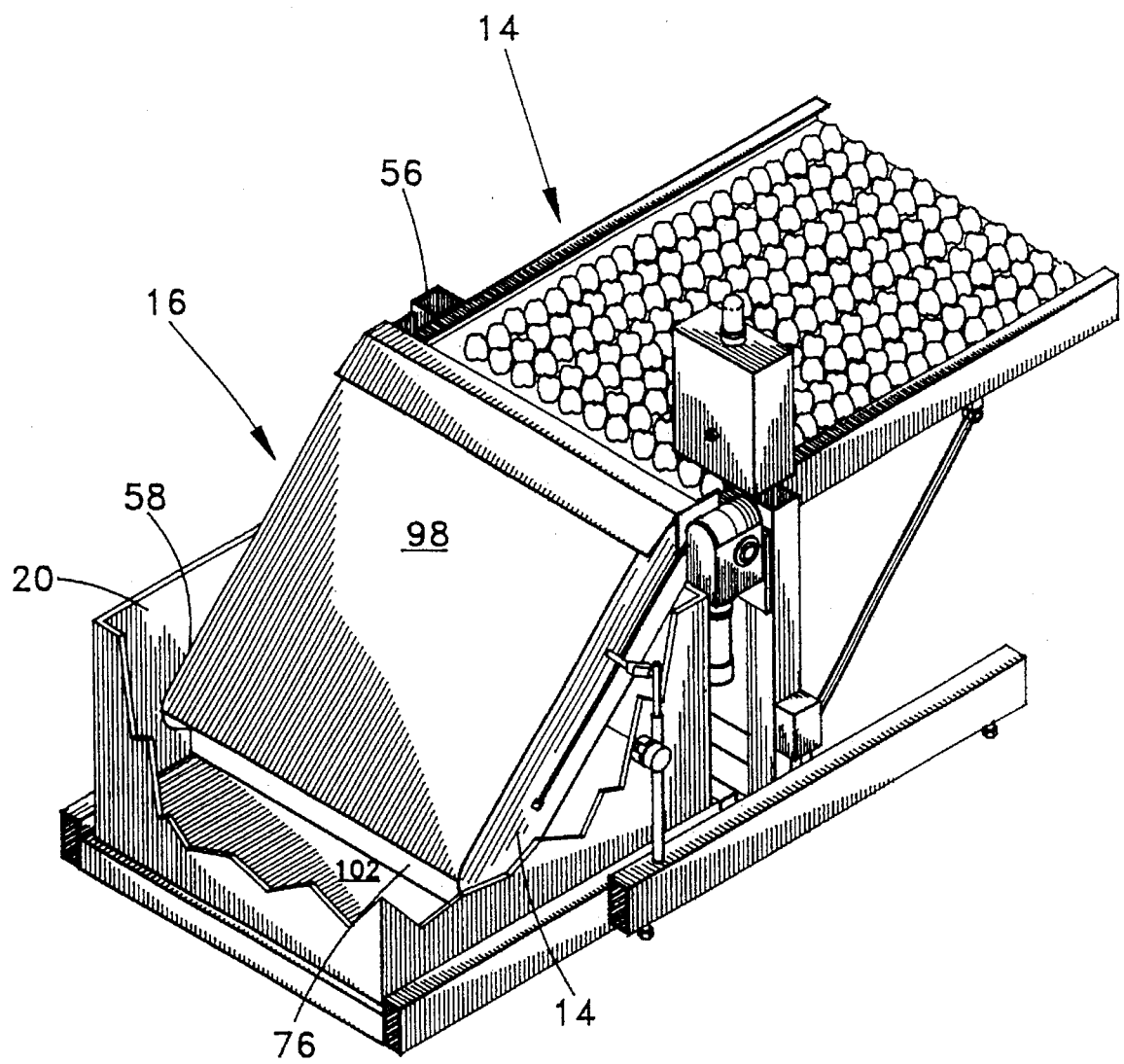
FIG. 8 is a perspective view of the bin filler with the cover in place.

With reference to FIG. 8, a cover 98 may be provided above the flaps 76 along the upper run 54 from proximate the pickup location 56 to proximate the drop location 58. The cover 98 prevents the articles 26 from being jostled about, and from falling off the filling conveyor 16. Stainless steel sheeting has been found to be suitable material for the cover 98.

Figure 9A:
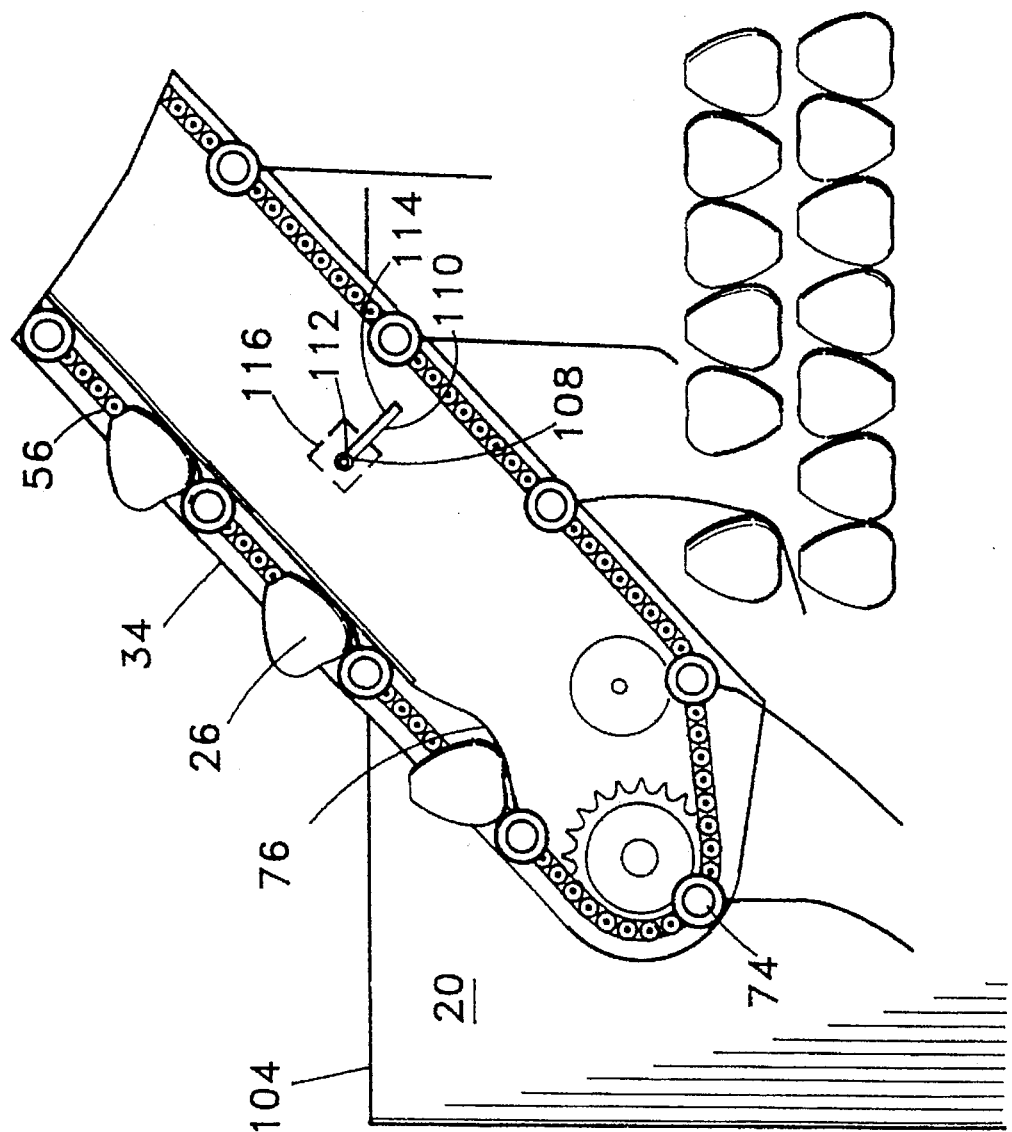
FIG. 9a is a side diagrammatic view of the offset detector and actuator detailing the offset detector.
Figure 9B:
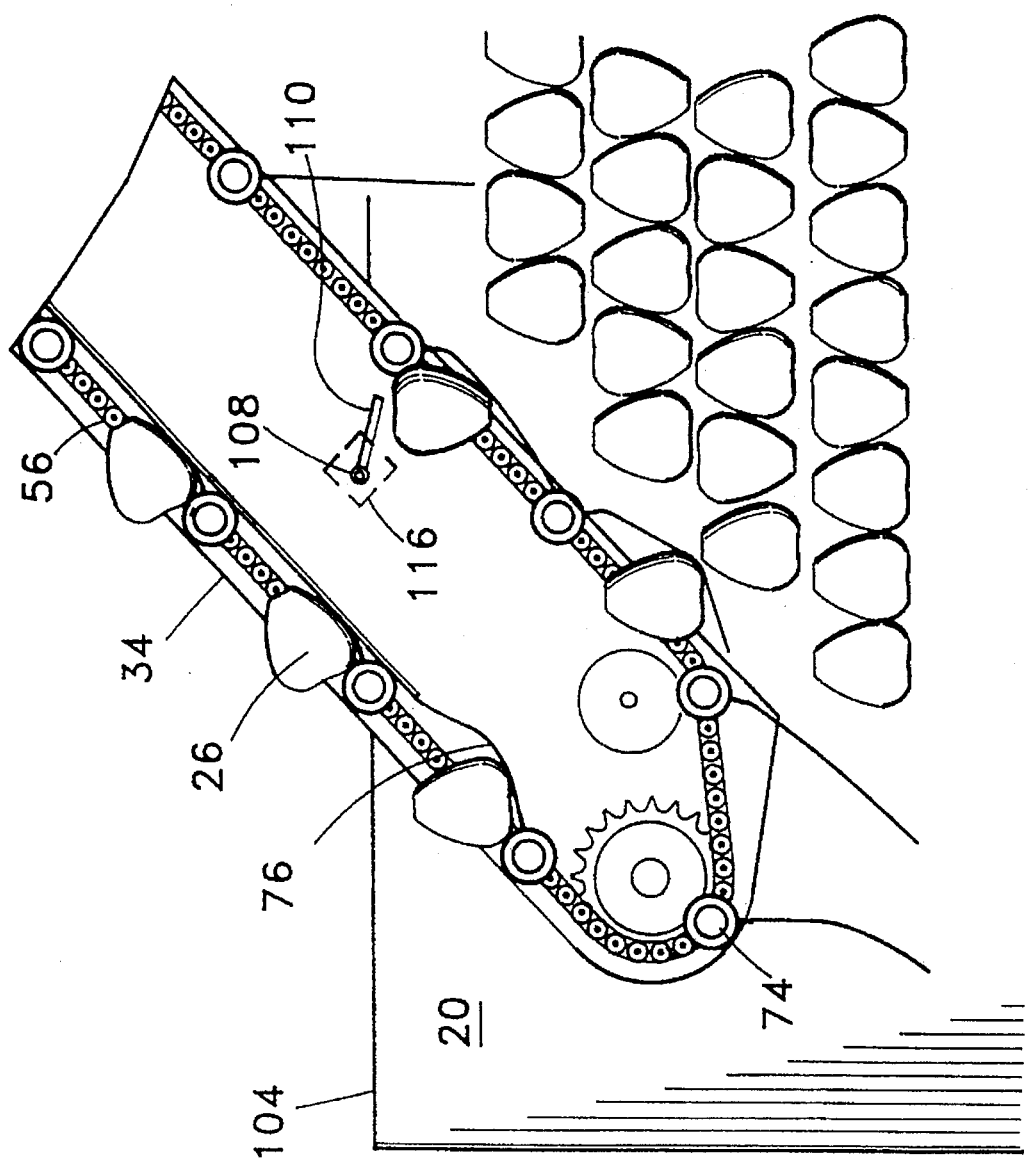
FIG. 9b is a side diagrammatic view of the offset detector and actuator operated in response to the offset detector.

With general reference to FIGS. 1–4, and particular reference to FIG. 9a and FIG. 9b, an actuator 100 is provided for pivotally moving the discharge end 38 of the filling conveyor 16 between a position proximate the bottom 102 of the bin 20 and a position spaced relatively above the top 104 of the bin 20. The actuator 100 may be implemented as a conventional hydraulic actuator, or a conventional screw type actuator. The actuator 100 is mounted to the frame at some point preferably spaced from the take-up end 36 thereof, or at the take-up end 36.

With continuing reference to FIGS. 1–4, and particularly to FIG. 9a and FIG. 9b, in the preferred embodiment, the actuator 100 is incrementally driven to maintain an offset distance between the lower run 62 and the level of articles 26 collected in the bin 20. While other methods, such as detecting the number of articles 26 deposited into the bin 20 may be used, detecting the offset distance has been found to be more precise. The offset detector 106 is implemented as a rod 108 pivotally mounted between the frame arms 32, 34. A plate 110 extending between the inside surfaces 73, 75 of the respective frame arms 32, 34 has an edge 112 fixed to the rod 108. The opposite edge 114 of the plate 110 is disposed slightly above the lower run 62 such that the plate 110 will contact any articles 26 being carried by the flaps 76, yet will not be contacted by the flaps 76 or support rods 74 themselves. Preferably the plate 110 is padded to prevent damage to the articles 26 from contact therewith. Contact with an article 26 causes the plate 110 and rod 108 to pivot which closes a normally open first microswitch 116. The closed switch condition causes the actuator 100 to pivot the filling conveyor 16 upward by some predefined increment in the conventional and well known manner.

Figure 2:
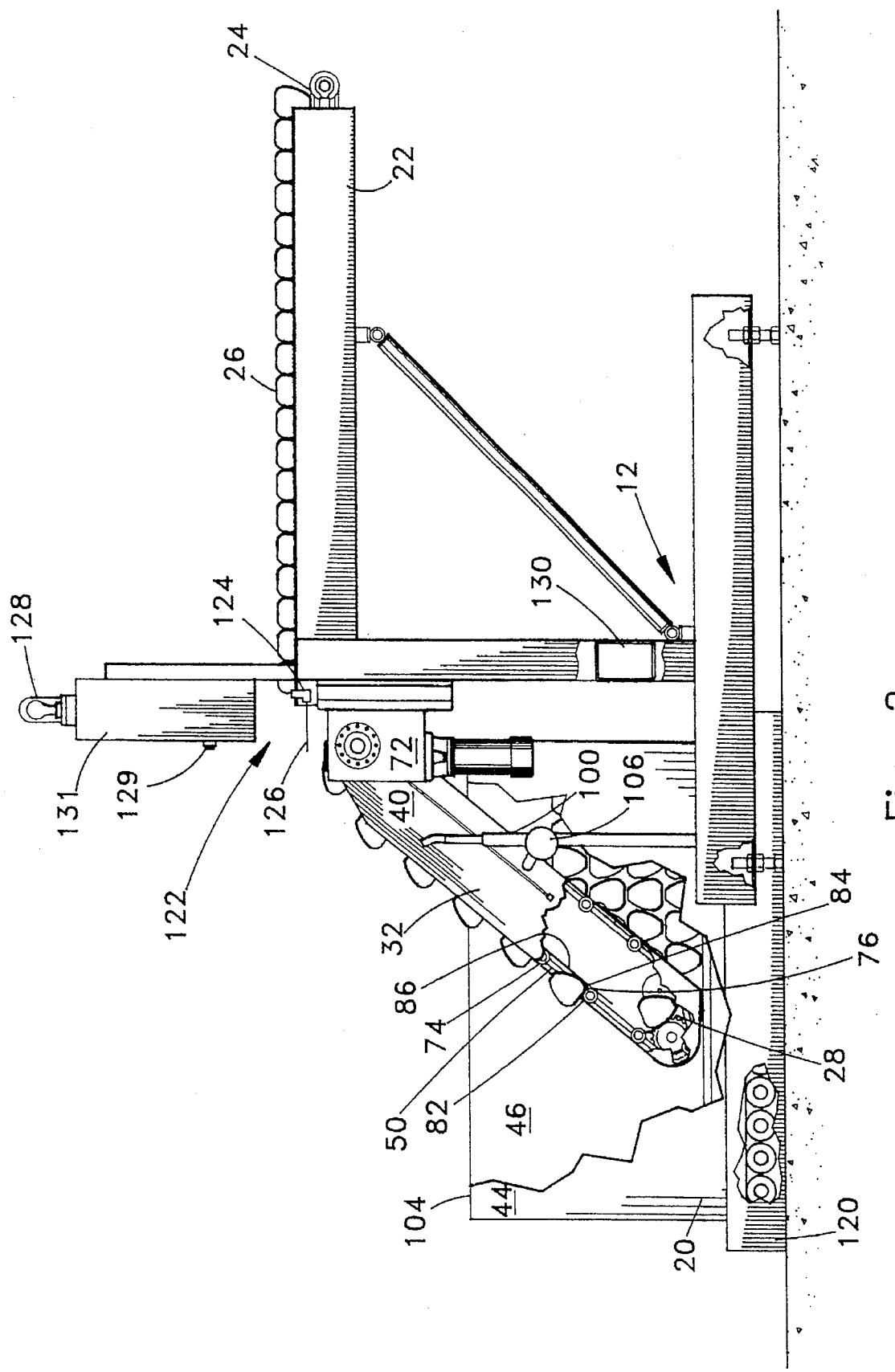
FIG. 2 is side elevational view of the bin filler in operation, the bin beginning to be filled, with a side wall of the bin and a portion of the filling conveyor frame broken away.
Figure 3:
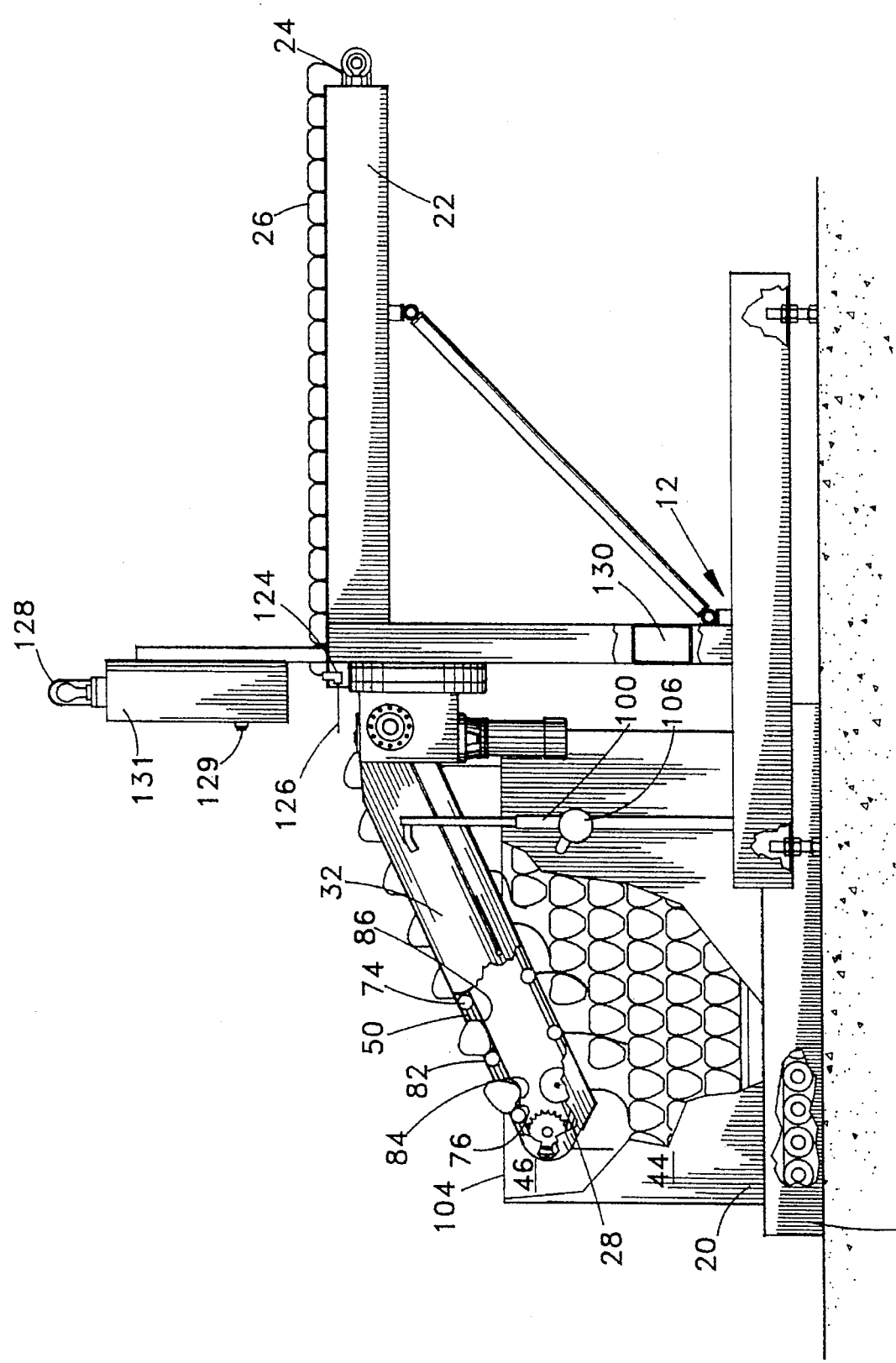
FIG. 3 is a side elevational view of the bin filler in operation, the bin partially filled, with a side wall of the bin and a portion of the filling conveyor frame broken away.
Figure 4:
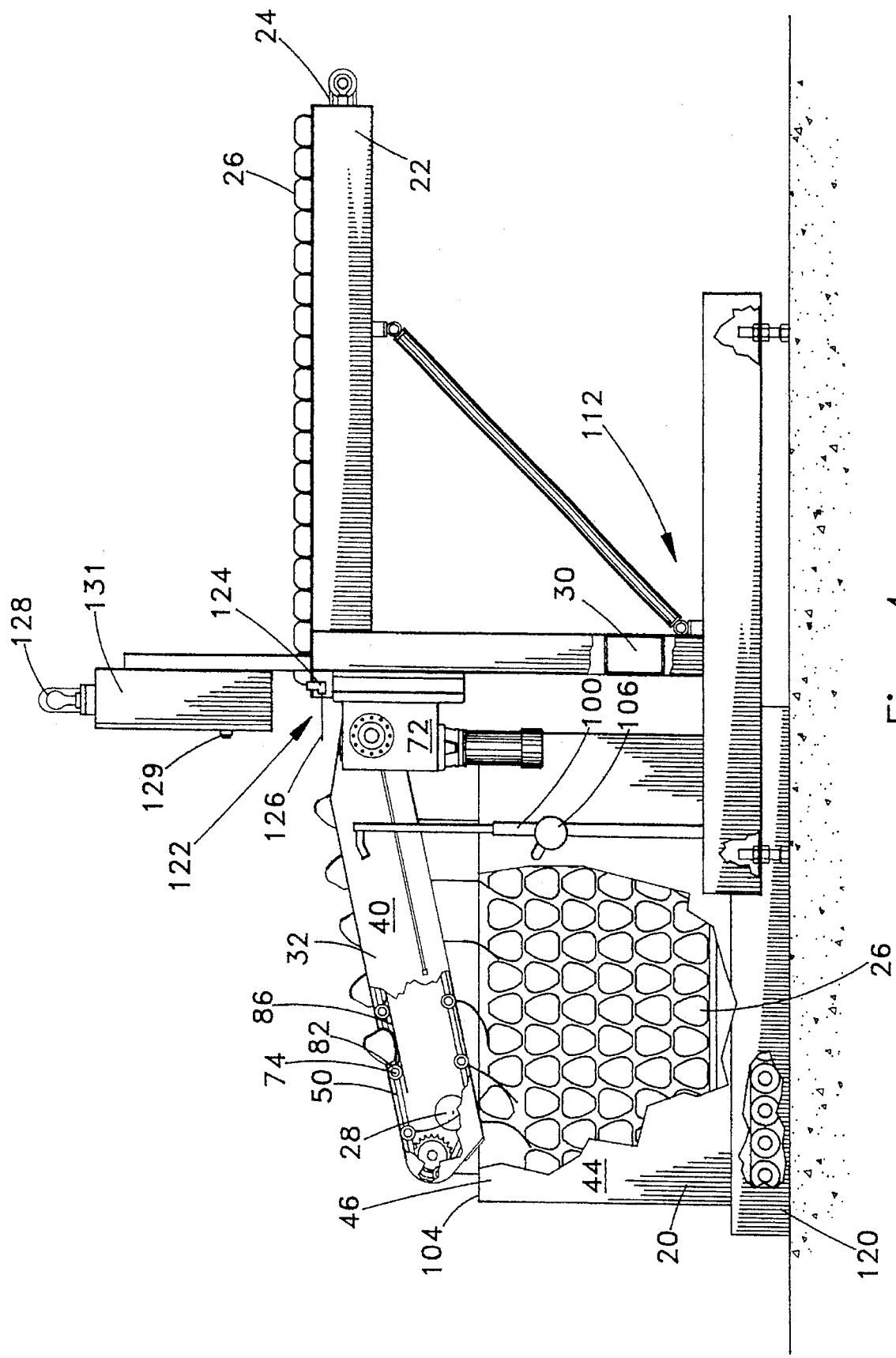
FIG. 4 is a side elevational view of the bin filler in operation, the bin almost completely filled with a side wall of the bin and a portion of the filling convey or frame broken away.

With particular reference to FIGS. 2–4, a bin conveyor 120 is provided for positioning empty bins 20 beneath the filling conveyor 16, and removing the bins 20 once they are filled with articles 26. A bin filled sensor 122 is provided on the base frame 12 for detecting the filled condition and triggering the bin conveyor 120. The bin filled sensor 122 is implemented as a second microswitch 124, triggered by a triggering flange 126 on one of the frame arms 32, 34. The bin filled sensor 122 also causes an indicator light 128 to be lit each time the bin filled condition is detected. A bin position sensor 130 is provided for detecting the presence of a bin 20, and trigger the filling conveyor 16 to pivot downward into bin 20 whenever an empty bin 20 is received.

With general reference to FIGS. 1–5 and particular reference to FIG. 7, in operation, a start switch 129 located on the control panel 131 is activated by the operator. The bin conveyor 120 positions an empty bin 20 underneath the discharge end 38 of the filling conveyor 16. The bin 20 is detected by the bin position sensor 130 which triggers the actuator 100 to pivot the filling conveyor 16 downward, into the bin 20, so that the discharge end 38 thereof is proximate the bottom 102 of the bin 20. The feeding conveyor 14 and the filling conveyor 16 each being driven, the feeding conveyor 14 delivering articles 26 on the take-up end 36 of the filling conveyor 16.

With continuing reference to FIGS. 1–5 and particular reference to FIG. 7, the description of the operation of the filling conveyor 16 will be discussed in terms of a representative first flap 132 and second flap 134. The other flaps 76 are simultaneously assuming positions associated with their respective locations 56, 58, 64, 66 which positions will be described in terms of the representative first and second flaps 132, 134.

The first flap 132 is moved successively through a pickup location 54; a drop location 58; a catch location 64, and a depositing location 66. The catch location 64 is disposed relatively below the drop location 58, such that an article 26 dropped at the drop location 58 will intersect the catch location 64.

As the first flap 132 approaches the pickup location 56, the front surface 136 of the first flap 132 engages the support surface 86. This causes the first flap 132 to pivot into an article receiving position 88, the rear surface 138 of the first flap 132 disposed relatively above a front surface 136, the front and rear surfaces 136, 138 respectively, of the first flap 132 substantially parallel to the upper run 54. A row of articles 28 are placed by the feeding conveyor 14 onto the rear surface 138 of the first flap 132.

The first flap 132 remains in the article receiving position 88 between the pickup location 56 and the drop location 58. The first flap 132 comes out of contact with the support surface 86 at the drop location 58. The first flap 132 is permitted to pivot to a substantially vertical article dropping position 96 under the influence of gravity. This action causes the row of articles 28 to drop off of the first flap 132.

The trajectory of the row of dropped articles 26 intersects with a catch location 64, spaced relatively below the drop location 58. As the row of articles 28 reach the catch location 64 the second flap 134 also reaches the catch location 64. Making the flaps 76 slightly longer than the space between adjacent support rods 74 ensures that a flap 76 will always be at the catch location 64 whenever the dropped articles 26 reaches that location 64. At this point the second flap 134 is on the lower run 62, which means the second flap 134 is moving in a direction opposite the direction it was moving on the upper run 54. The second flap 134 being free to pivot under the influence of gravity and its acceleration vector assumes an article catching position 64, in which its front surface 138 is above its rear surface 140. The dropped articles 26 come to rest on the front surface 138 of the second flap 134.

As the second flap 134 continues along the lower run 62, the rear surface 140 thereof eventually contacts either the bottom 102 of the bin 20 or articles 26 previously deposited 142 in the bin 20. The contact gives rise to two different actions.

The continuing motion along the lower run 62 by the second flap 134 tends to sweep the previously deposited articles 142 toward an end of the bin 20 away from the discharge end 38 of the filling conveyor 16. This sweeping motion creates a stack of deposited articles 142 arranged in rows 28 across the width of the bin 20. The sweeping motion takes place between the catch location 64 and the end of the lower run 62.

The contact with the previously deposited articles 142 also, tends to trap the second flap 134 between the row of articles 28 being carried on the front surface 138 of the second flap 134 and the previously deposited articles 142. This causes the second flap 134 to be drawn out from between the articles 26 being carried on the front surface 138 and the articles 142 being contacted by the rear surface 140, causing the articles 26 carried on the front surface 138 to be gently deposited from the second flap 134 and into the bin 20. This takes place in the depositing location 66, an area between the catch location 64 and the end of the lower run 62.

The flaps 76 are driven through the various locations 56, 58, 64, 66 and positions 88, 96, 98 successively. Each time an article 26 contacts the plate 110, the plate 110 and rod 108 pivot slightly, triggering the actuator 100 to raise the filling conveyor 16. When the bin 20 becomes full, the filling conveyor frame 30 reaches a level at which the triggering flange 126 operatively engages the second microswitch 124. The feeding conveyor 14 and filling conveyors 16 are then stopped, while the bin conveyor 120 removes the full bin 20 and replaces it with an empty bin 20, at which point the process starts over.

The distance between the upper and lower runs 54, 62 respectively, the length of the respective runs 54, 62, the space between adjacent support rods 74 and the speed at which the drive belts 50, 52 are driven may each be varied to achieve any desired results. Additionally, the pivoting motion of the filling conveyor 16 may be smooth rather than incremental if desired.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principals of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims which follow.

I claim:

1. A method of loading a plurality of articles into a bin which comprises the steps of:

driving a continuous member having a plurality of resilient flaps pivotally mounted thereto along an upper run, about a first axis, along a lower run and about a second axis, the second axis substantially parallel to and spaced from the first axis;

supporting the flaps in a position substantially parallel the upper run during the flaps movement along the upper run between a pickup location proximate the second axis and a drop location proximate the first axis;

feeding a plurality of articles onto each of the flaps as each of the flaps passes the pickup location;

permitting the flaps to pivot under the influence of gravity into an article dropping position as each of the flaps passes the drop location;

permitting the flaps to pivot under the influence of gravity and the movement thereof along the lower run into an article catching position;

catching the plurality of articles on each of the flaps as each of the flaps passes a catch location;

depositing the plurality of articles into the bin between the catch location and an end of the lower run; and sweeping the plurality of articles away from the catch location with the flaps.

2. The loading method of claim 1 further comprising:

pivotally lowering the discharge end of the conveyor into the bin; and pivotally incrementing the conveyor upward to maintain the drop location at an offset distance above the articles collected in the bin.

3. A method for loading a plurality of articles into a bin with a filling conveyor having a plurality of resilient flaps pivotally mounted at one end thereof to the filling conveyor for movement therewith along an upper run and a lower run thereof, the method comprising the steps of:

a. pivoting a first of the flaps into an article receiving position;

b. loading a first of the articles onto the first flap at a pickup location proximate a first end of the upper run;

c. advancing the first flap with the first article thereon to a drop location proximate a second end of the upper run;

d. pivoting the first flap to drop the first article therefrom;

e. positioning a second flap under the drop location;

f. pivoting the second flap into an article catching position;

g. catching the first article on the second flap; and h. depositing the first article off the second flap and into the bin.

4. The loading method of claim 3 further comprising the step of:

i. sweeping a previously deposited article along the lower run.

5. The loading method of claim 4 further comprising the step of:

j. pivoting the filling conveyor about the first end thereof to maintain the filling conveyor at predefined offset above the previously deposited article.

6. The loading method of claim 5 further comprising the step of: repeating the steps a through j until the bin is full.

7. A method of loading articles into a bin comprising the steps of:

a. moving a plurality of flaps pivotally mounted at one end thereof to an endless conveyor member successively through a pickup location;

a drop location;

a catch location, the catch location disposed relatively below the drop location; and a depositing location;

b. feeding the articles onto the flaps as the flaps pass the pickup location;

c. dropping the articles from the flaps as the flaps pass the drop location;

d. catching the articles on the flaps as the flaps pass the catch location;

e. depositing the articles into the bin as the flaps pass between the catch location and the depositing location; and f. sweeping the articles away from the catch location with the flaps.

8. The loading method of claim 7 further comprising the step of:

pivoting a portion of the endless conveyor member proximate the catch location into the bin before step a.

9. The loading method of claim 8 further comprising the step of:

g. maintaining the depositing location above the articles collected in the bin by pivoting the endless conveyor member upward.

10. The loading method of claim 9 further comprising the step of:

repeating the steps a through g until the bin is full.

11. The loading method of claim 7 wherein the step of feeding comprises the steps of:

supporting the flaps with a support surface between the pickup location and the drop location such that a rear surface is above a front surface; and placing the articles on the rear surface of the flaps.

12. The loading method of claim 7 wherein the dropping step comprises the steps of:

removing the flaps from the support surface; and permitting the flaps to pivot substantially to vertical under the influence of gravity.

13. The loading method of claim 7 wherein the catching step comprises the steps of:

permitting one of the flaps to pivot such that the front surface of the flap is above the rear surface of the flap; and positioning the flap under the drop location such that the dropped article contacts the front surface of the flap.

* * * * *